United States Patent [19]
Ota et al.

[11] Patent Number: 5,389,932
[45] Date of Patent: Feb. 14, 1995

[54] PULSE COMPRESSION CONTROL SYSTEM

[75] Inventors: Eikichi Ota, Kawasaki; Asao Komata, Fuchu, both of Japan

[73] Assignee: Fujitsu Limited, Kawasaki, Japan

[21] Appl. No.: 969,150

[22] PCT Filed: June 4, 1992

[86] PCT No.: PCT/JP92/00721
§ 371 Date: Feb. 10, 1993
§ 102(e) Date: Feb. 10, 1993

[87] PCT Pub. No.: WO92/22825
PCT Pub. Date: Dec. 23, 1992

[30] Foreign Application Priority Data

Jun. 10, 1991 [JP] Japan ................. 3-137561

[51] Int. Cl.⁶ ............................................. G01S 13/30
[52] U.S. Cl. ................... 342/189; 342/134; 342/145; 342/202
[58] Field of Search ............... 342/189, 132, 134, 135, 342/145, 202, 203, 204

[56] References Cited

U.S. PATENT DOCUMENTS

| | | | |
|---|---|---|---|
| 3,945,010 | 3/1976 | Wardrop | 342/194 |
| 4,379,295 | 4/1983 | Lewis et al. | 342/201 |
| 4,513,288 | 4/1985 | Weathers et al. | 342/201 |
| 4,566,010 | 1/1986 | Collins | 342/201 |
| 4,580,139 | 4/1986 | Weathers et al. | 342/189 |
| 4,626,854 | 12/1986 | Kretschmer, Jr. et al. | 342/196 |
| 5,151,702 | 9/1992 | Urkowitz | 342/134 |
| 5,291,202 | 3/1994 | McClintock | 342/16 |
| 5,293,168 | 3/1994 | Faulkner | 342/145 |

FOREIGN PATENT DOCUMENTS

| | | |
|---|---|---|
| 58-123483 | 7/1983 | Japan . |
| 61-147175 | 7/1986 | Japan . |
| 6479682 | 3/1989 | Japan . |

*Primary Examiner*—John B. Sotomayor

[57] ABSTRACT

A pulse compression control system uses a code sequence having a larger self correlation side lobe level compared with an ideal code sequence as a transmission code sequence and includes a modulating unit for modulating a pulse by the transmission code sequence in a first order modulation unit. The pulse is received in a demodulating unit where it is demodulated. A reception code sequence from the demodulation unit is modulated by a key code sequence in a second order modulation unit so as to convert it to the ideal code sequence. A self correlation processing unit processes the ideal code sequence for pulse compression.

2 Claims, 10 Drawing Sheets

| | CODE SEQUENCE | SIDE LOBE LEVEL (dB) | |
|---|---|---|---|
| 1 | 0000 0101 1000 1 | −16.2472 | |
| 2 | 0010 1100 0100 0 | −16.2472 | |
| 3 | 0000 1010 0110 0 | −16.2472 | |
| 4 | 0110 1111 1000 1 | −16.2472 | |
| 5 | 0000 0101 1001 1 | −16.2472 | |
| 6 | 0011 0000 0010 1 | −16.2472 | |
| 7 | 1111 0001 0010 0 | −16.2472 | |
| 8 | 0111 0010 1111 1 | −16.2472 | CODE SEQUENCE B |
| 9 | 0100 0010 1100 1 | −16.2472 | |
| 10 | 0001 0111 1001 1 | −16.2472 | |
| 11 | 0011 0010 1000 0 | −16.2472 | |
| 12 | 0101 0011 0000 0 | −22.2638 | CODE SEQUENCE A' |

Fig.5B

|  | CODE SEQUENCE | SIDE LOBE LEVEL (dB) |  |
|---|---|---|---|
| 13 | 1010 0110 0000 0 | -16.2472 |  |
| 14 | 0011 0010 1111 1 | -16.2472 |  |
| 15 | 1001 1000 0010 1 | -16.2472 |  |
| 16 | 1001 1100 1101 0 | -16.2472 |  |
| 17 | 1111 1100 1101 0 | -16.2472 | CODE SEQUENCE D |
| 18 | 1111 1001 1010 1 | -22.2638 | CODE SEQUENCE A |
| ⋮ | ⋮ | ⋮ |  |
| 30 | 1010 1111 0010 0 | -16.2472 | CODE SEQUENCE C |
| ⋮ | ⋮ | ⋮ |  |
| nn | 0001 0100 1001 1 | -16.2472 |  |

PULSE COMPRESSION CONTROL SYSTEM

TECHNICAL FIELD

BACKGROUND OF THE INVENTION

The present invention relates to a pulse compression control system using a double modulation applied to a radar transmission pulse, a synchronous pulse for communication or the like and utilization of a code sequence having low side lobes in an autocorrelation function.

By transmitting modulated pulses by a code sequence having a length of N, an autocorrelation of which designates a sharp peak value at one point and by receiving and demodulating this pulse and obtaining the autocorrelation, a compression of 1/N in the pulse width and an expansion of N times in an amplitude can be carried out. Therefore, when this art is applied to radar by transmitting the pulse at low peak electric power, receiving the reflected pulse, and compressing the pulse, the resolution can increase. Also, by applying to various information transmissions, a correct synchronous point can be detected.

PRIOR ART

It is known that the code sequence having sufficiently low side lobes compared with the main peak value of the autocorrelation function, for example, is a Barker code. For example, a pulse having a width of T is phase modulated by the Barker code "1110010", which is constituted by 7 bits in which one bit length is T/7. Namely, a code "1" is phase modulated to a carrier phase of 0° and a code "0" is phase modulated to a phase of 180°, and then a coded phase modulated pulse is obtained. The coded modulated pulse is transmitted as a radar pulse.

The coded phase modulated pulse is reflected from a target article or the like, receives the reflected pulse, and is phase synchronously detected to obtain the detection output +1, +1, +1, −1, −1, +1, −1 in a term T, if, for example, the signal having a carrier phase of 0° is +1, and the signal having a carrier phase of 180° is −1. The detected output signal itself or the inverted detected signal is added at a certain timing, and then the output signal having an amplitude level of 7 can be obtained once. In the other case, amplitudes are 0 or −1. Accordingly, by utilizing the output signal having the amplitude of 7, if using a transmission pulse having a pulse width of T, the resolution is the same as when using the transmission pulse having a pulse width of T/7 can be obtained.

It has been found that there are approximately 9 Barker codes having only side lobes of 0 or ±1 between N=2 and N=6084, namely, in the case of N=2 there are 2, in the case of N=3 there is 1, in the case of N=4 there are 2, in the case of N=5 there is 1, in the case of N=7 there is the above-mentioned 1, in the case of N=11 there is 1, and in the case of N=13 there is 1.

Further an M sequence (Maximal length sequence) is known as a code sequence that is applied to a coded pulse radar. For example, in the case where period L is 7, the M sequences include a code sequence of "1110100" besides the above Barker code sequence. Also, in the case where L=15, for example, the code sequences "111100010011010" and "111101011001000" have been known. Further in the case of L=31, six code sequences have been found.

As mentioned above, few code sequences wherein the autocorrelation function thereof has a sharp peak at one point exist in the Barker sequences or the M sequences, therefore, the coded pulse radar using an identical code sequence is made to have large interference and it is difficult for the coded pulse radar to operate in an excessively dense environment.

In the case where the system is applied in a multi-access communication system or the like, since code sequences by which a synchronous pulse is modulated are few, it is difficult to increase the number of subscribers utilizing the system.

SUMMARY OF THE INVENTION

An object of the present invention is to increase the kinds of usable code sequences by allowing a certain amount of side lobe in a pulse compression system using code sequences having a sharp peak at one point in an autocorrelation function thereof and having low side lobes.

A pulse compression control system of the present invention comprises a first order modulation means for modulating a pulse using a transmission code sequence that has a higher side lobe level of self correlation than an ideal code sequence wherein the correlation function has a sharp peak at one point and has low side lobes, and for transmitting the modulated pulse; a demodulation means for demodulating the modulated pulse from the first order modulation means to obtain a reception code sequence; a second order modulation means for modulating the reception code sequence outputted from the demodulation means to convert it to an ideal code sequence; and self correlation processing means for carrying out pulse compression processing of the ideal code sequence outputted from the second order modulation means.

DETAILED DESCRIPTION OF THE PREFERRED EMBODIMENTS

Prior to the explanations of the embodiments according to the present invention, the prior art is explained with reference to FIG. 1A, FIG. 1B, and FIG. 1C.

As mentioned above, the Barker code is known as code sequences having sufficiently low side lobes compared with a main peak value of the autocorrelation function. FIG. 1A, FIG. 1B, and FIG. 1C are explanatory diagrams showing pulse compression in the case where Barker code "1110010" is used. First, a pulse having a pulse width T is modulated in phase by using the Barker code of 7 bits, the length of one bit of which is T/7. For example, if the code "1" is modulated as 0° of a carrier phase and the code "0" is modulated as 180° of a carrier phase, the coded phase modulated pulses as shown in the upper stage of FIG. 1A are obtained. The coded modulated pulses are transmitted as a radar pulse.

Figure 1A:
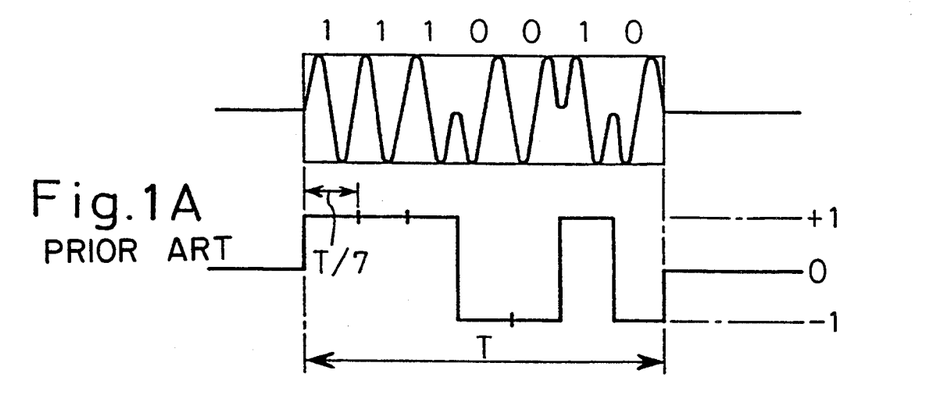
FIGS. 1A, FIG. 1B, and FIG. 1C are diagrams explaining pulse compression.

The coded phase modulated pulse is reflected by a target or the like, received, and detected synchronously in phase so that, for example, the carrier phase 0° becomes +1 and the carrier phase 180° becomes −1, and then as shown in the lower stage in FIG. 1A, the detection outputs +1, +1, +1, −1, −1, +1, −1 are obtained during time T. The detected output signal is supplied to an input terminal IN of the pulse compression section shown in FIG. 1B. The pulse compression section comprises a delay circuit 51, an addition circuit 52, and polarity inversion circuits 53, 54, and 55. At a timing when the code sequence "1110010" (=+1, +1, +1, −1, −1, +1, −1) from the transmission side is supplied to each tap and to the input terminal IN of the delay circuit 51 as shown in the figure, the addition circuit 52 is inputted with all "1" (=+1) in 7 bits, then the amplitude level of 7 is outputted through the output terminal. Namely, as shown in FIG. 1C, an output signal of the amplitude of 7 is obtained. Further, the autocorrelation side lobe levels become 0 or −−1 in the amplitude level at a timing other than when the peak value of the autocorrelation function becomes 7. Accordingly, by utilizing the output signal having an amplitude of 7, even using the transmission pulse of pulse width T, the same resolution as in the case when the transmission pulse having the width of T/7 is used, can be obtained.

Figure 1B:
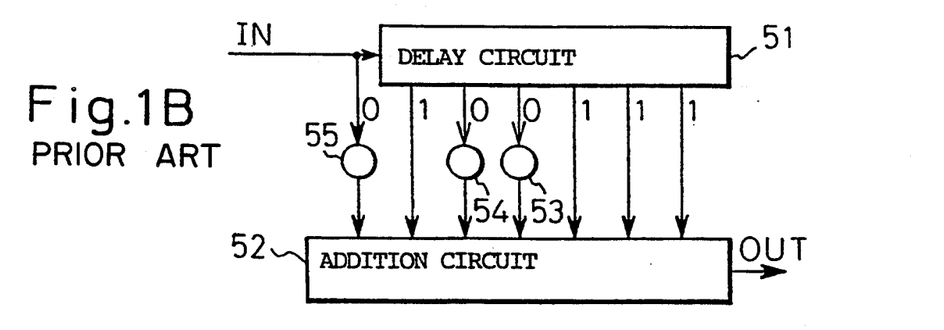
Figure 1C:
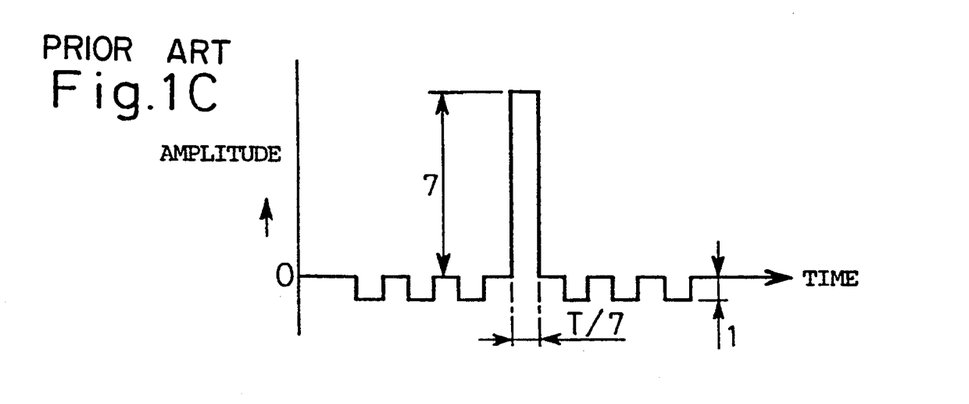

Also, in the case when the coded phase modulated pulses shown in the upper stage of FIG. 1A are supplied to the input terminal IN of FIG. 1B, if the polarity inversion circuits 53, 54, and 55 are replaced by phase shifters of 180°, since the addition circuit 52 is supplied with an identical phase signal at a certain timing, at that timing, as in the above-mentioned case, the output signal having an amplitude of 7 can be obtained through the output terminal OUT.

Figure 2:
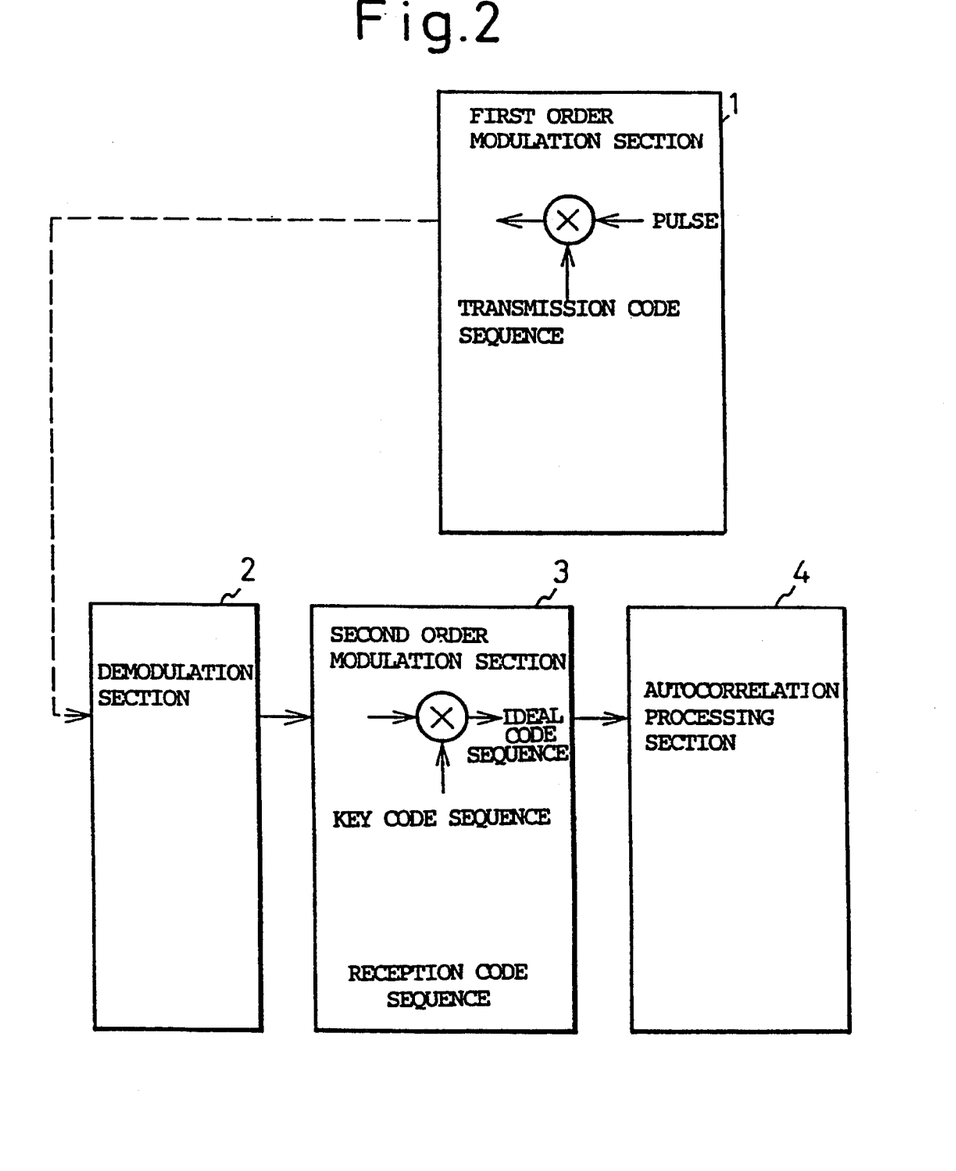
FIG. 2 is a block diagram of a pulse compression control system according to an embodiment of the invention.

Next, an embodiment of the present invention in principle is explained with reference to FIG. 2.

Although only a few kinds of ideal coded sequences exist in the Barker codes and the M sequence codes, it is known that many code sequences having an autocorrelation side lobe larger than that of the same exist. By using these code sequences as a transmission code sequence, the pulse is modulated in a first order modulation section 1, the modulated pulse is transmitted as a radar pulse or a synchronous pulse. The autocorrelation function of the reception code sequence obtained by receiving and demodulating the modulated pulse in a demodulation section 2, has a sharp peak at one point. However, since the autocorrelation side lobe level is larger than that of the ideal code sequence, it is possible to generate a recognition error in the peak point. Therefore, the code sequence is modulated to the ideal code sequence in a second order modulation section 3, and by using the ideal code sequence, the autocorrelation is obtained to compress the pulse in an autocorrelation processing section 4. Since, in the above processing, the code sequence is modulated at the transmission side and the reception side, the code sequence is double modulated. Thus, even using the transmission code sequences other than the ideal code sequences, the transmission code sequences can be converted to the ideal code sequences; accordingly, the pulse can be compressed similarly to the case where the pulse is modulated by using the ideal code sequences.

In the second order modulation section 3, a conversion from the reception code sequence to the ideal code sequence can be carried out by using a key code sequence that represents a difference between the ideal code sequence and the transmission code sequence. Accordingly, even when the transmission code sequence changes according to a lapse of time, the key code sequence changes accordingly, and thus easy conversion to the ideal code sequence is possible.

The transmission code sequences are, for example, obtained in the following way. First, pseudorandom codes are generated by utilizing a mathematical Chaos phenomenon, the autocorrelation function thereof is obtained, and code sequences less than level two in the autocorrelation side lobe level are extracted. Namely, code sequences approximately more than level one compared with the ideal code sequence in the autocorrelation side lobe level, are used. As a result, many kinds of usable code sequences can be made available.

The second order modulation section 3 comprises a key code generation section for generating the key code sequence that represents a difference between the ideal code sequence and the transmission code sequence, and a circuit constitution for modulating the reception code sequence from a demodulation section 2 using the key code sequences from the key code generation section so as to form the ideal code sequence.

The transmission code sequence supplied to the first order modulation section 1 can select code sequences less than level two in the autocorrelation side lobe level. In this case, less than level two means that the code sequences have larger side lobe levels (less than one rank) compared with the ideal code sequences, which have level one side lobes.

Details of the embodiment of the invention is explained with reference to FIG. 3 to FIG. 9.

Figure 3:
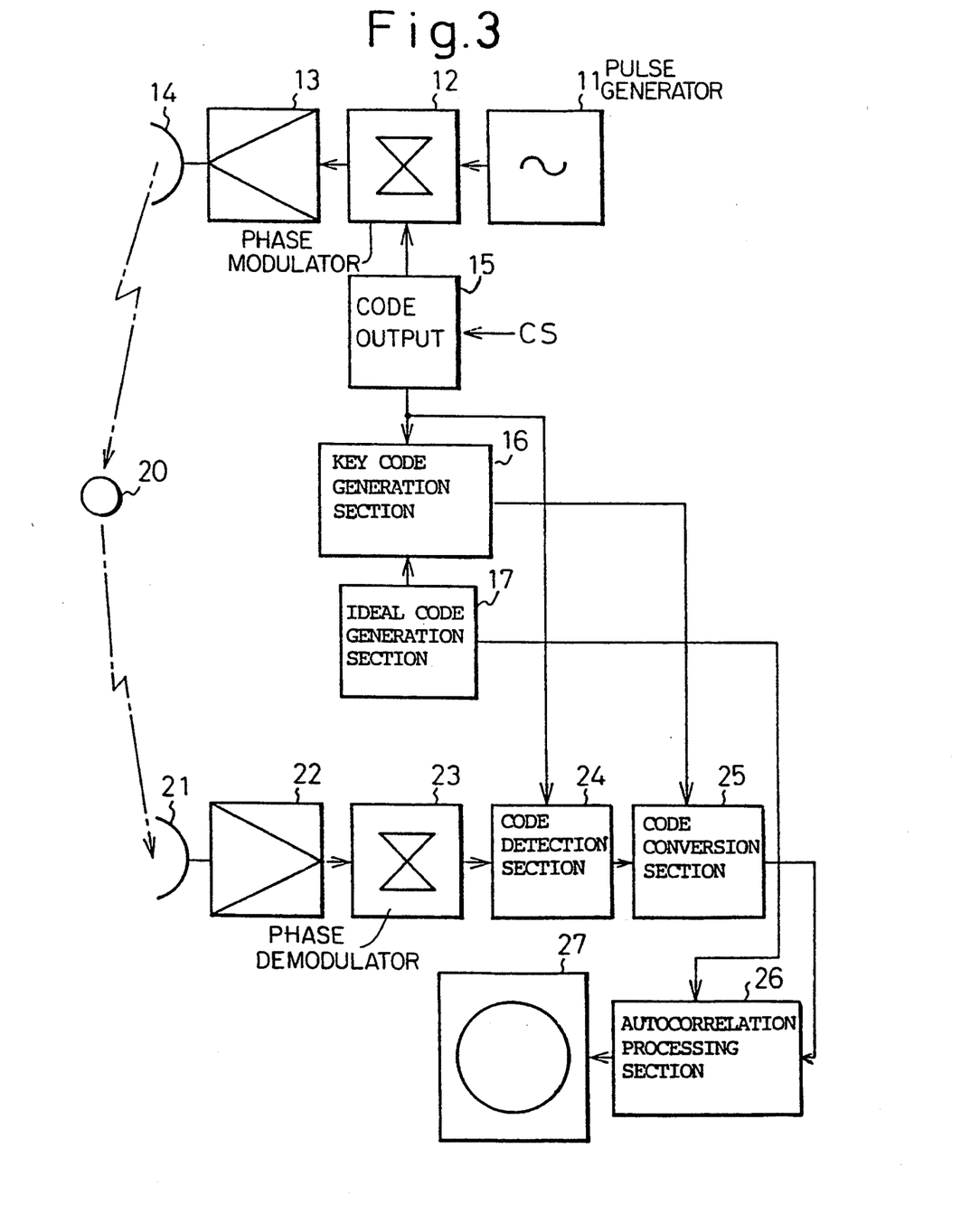
FIG. 3 is a block diagram showing details of the system according to an embodiment of the invention.

FIG. 3 is a detailed block diagram of the embodiment of the invention and the embodiment applied to a coded pulse radar is shown, wherein numeral 11 is a pulse generation section, 12 is a phase modulation section, 13 is a transmission amplifier section, 14 is a transmission antenna, 15 is a code output section, 16 is a key code generation section, 17 is an ideal code generation section, 20 is a target, 21 is a reception antenna, 22 is a reception amplifier section, 23 is a phase demodulation section, 24 is a code detection section, 25 is a code conversion section, 26 is an autocorrelation processing section, and 27 is a display section.

The pulse generation section 11, the phase modulation section 12, the transmission amplifier section 13, the transmission antenna 14, and the ideal code generation section 17 constitute a transmission section of a usual coded pulse radar. The reception antenna 21, the reception amplifier section 22, the phase demodulation section 23, the autocorrelation processing section 26, and the display section 27 constitute a reception section of the usual coded pulse radar. In this embodiment, the code output section 15, the key code generation section 16, the code detection section 24, and the code conversion section 25 are added to the above usual constitution. The phase modulation section 12 corresponds to a partial constitution of the first order modulation section 2 of FIG. 2 and the code conversion section 25 corresponds to the second order modulation section 3 of the apparatus of FIG. 2. The transmission antenna 14 and the reception antenna 21 are generally used in common. However, for convenience, these antenna are illustrated separately.

The code output section 15 outputs one of code sequences that have a sharp peak at one point in the autocorrelation function and have the autocorrelation side lobe level of less than level two, in accordance with a code selection signal CS. The selected and output code sequence is added to the phase modulation section 12 as a transmission code sequence, and the pulse from the pulse generation section 11 is phase modulated. The key code generation section 16 adds the difference of the code sequence between the ideal code sequence from the ideal code generation section 17 and the code sequence from the code output section 15 to the code conversion section 25 as the key code sequence.

Figure 4:
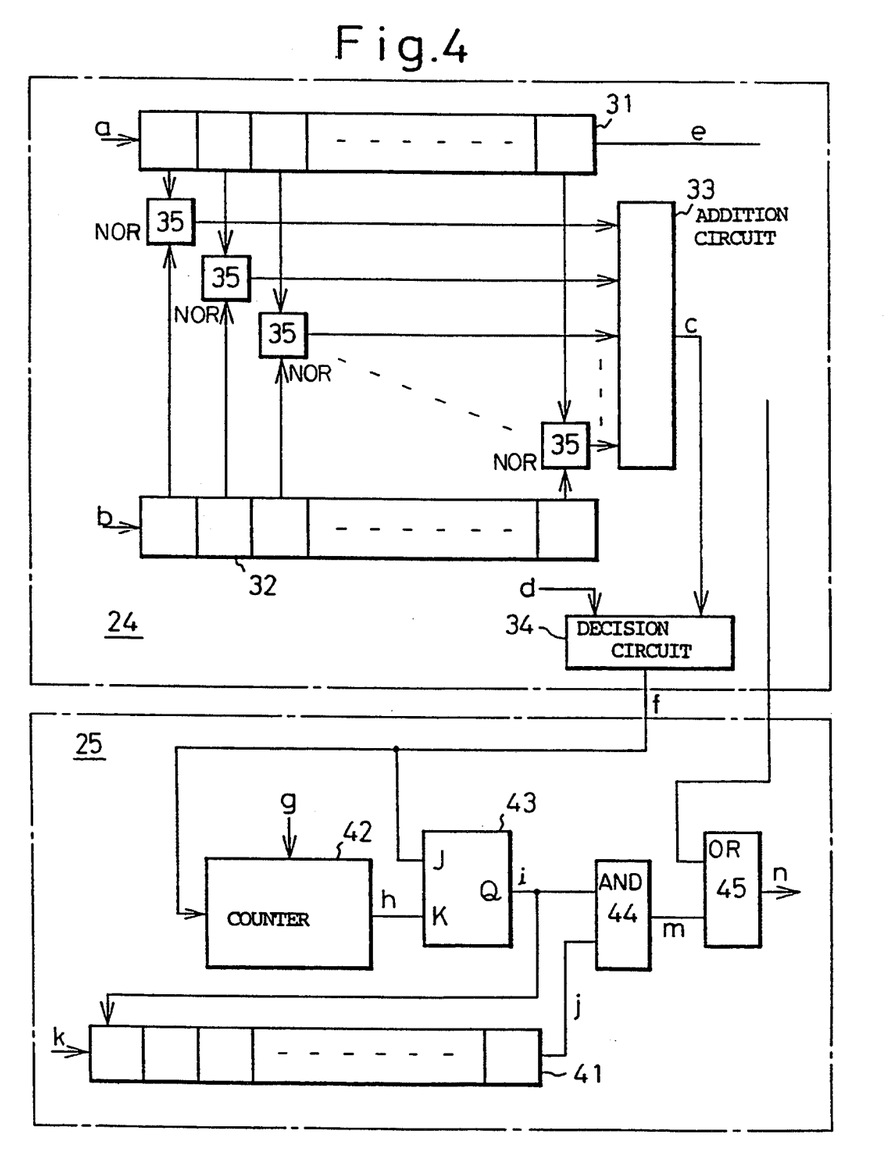
FIG. 4 is a circuit diagram showing a code detection section and a code conversion section of the system of FIG. 3.

The code detection section 24 and the code conversion section 25 have, for example, constitutions shown in FIG. 4, where numeral 31 is an input shift register, 32 is a reference register, 33 is an addition circuit, 34 is a decision circuit, 35 is a respective exclusive NOR circuit, 41 is a key code register, 42 is a counter, 43 is a flip-flop, 44 is an AND circuit, and 45 is an exclusive OR circuit. Demodulation signal a from the phase demodulation section 23 (conf. FIG. 3) is input to the input shift register 31, shifted sequentially, and transmission code sequence b from the code output section 15 is input to the reference register 32 to set. Each output signal of the input shift register 31 and each output signal of the reference register 32 are then supplied to the exclusive NOR circuits 35; the output signals of each exclusive NOR circuit 35 are supplied to the addition circuit 33, and the output signal c of circuit 33 is compared with a set value d in the decision circuit 34.

In the code conversion section 25, the key code sequence k from the key code generation section 16 is input and set in the key code register 41, and bit number g of the code sequence is set into the counter 42. A decision output signal f from the decision circuit 34 in the code detection section 24 is supplied as a count start signal of the counter 42, and the count of the clock signal (not shown) starts. The decision output signal f is supplied to a J terminal of the flip-flop 43, and a Q terminal output signal i of the flip-flop 43 becomes "1". The "1" in the output signal i is input as a shift mode signal of the key code register 41, the key code sequence j is supplied sequentially to the AND circuit 44 from the key code register 41, key code sequence m output from the AND circuit 44 and input code sequence e output from the input shift register 31 in the code detection section 24 are input to the exclusive OR circuit 45 and converted to ideal code sequence n for output.

Figure 5A:
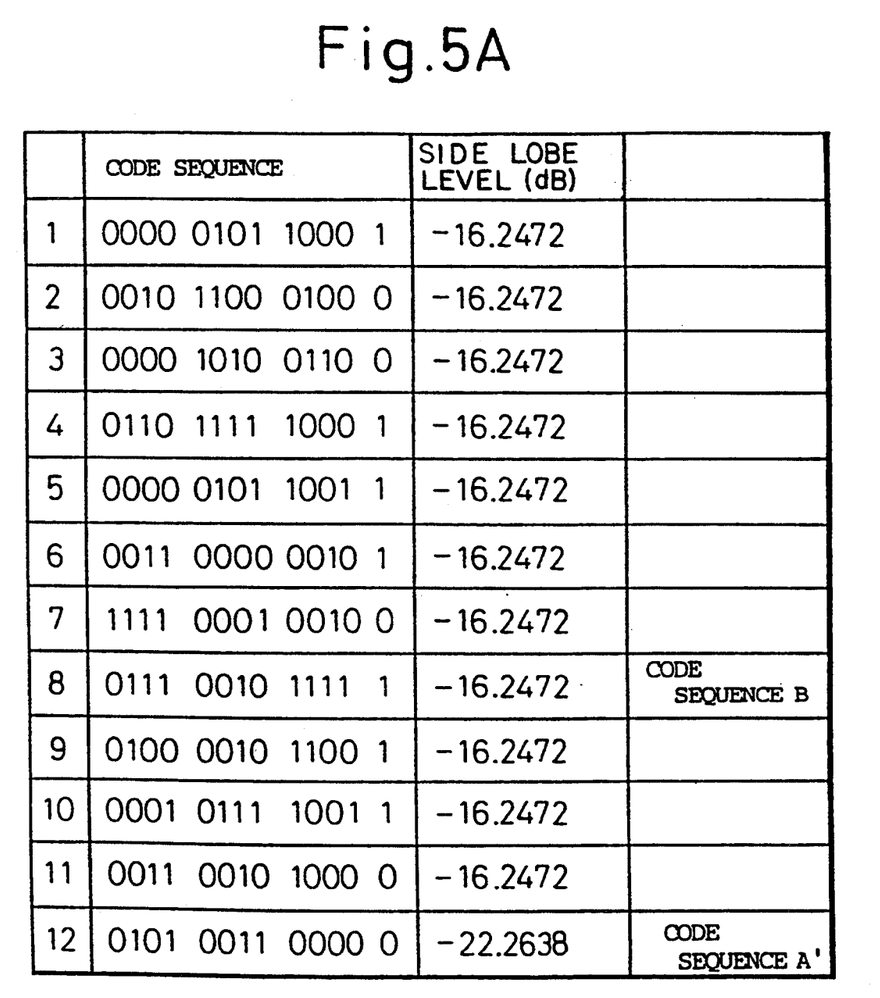
FIGS. 5A and FIGS. 5B are explanatory diagrams showing code sequences of 13 bits.
Figure 5B:
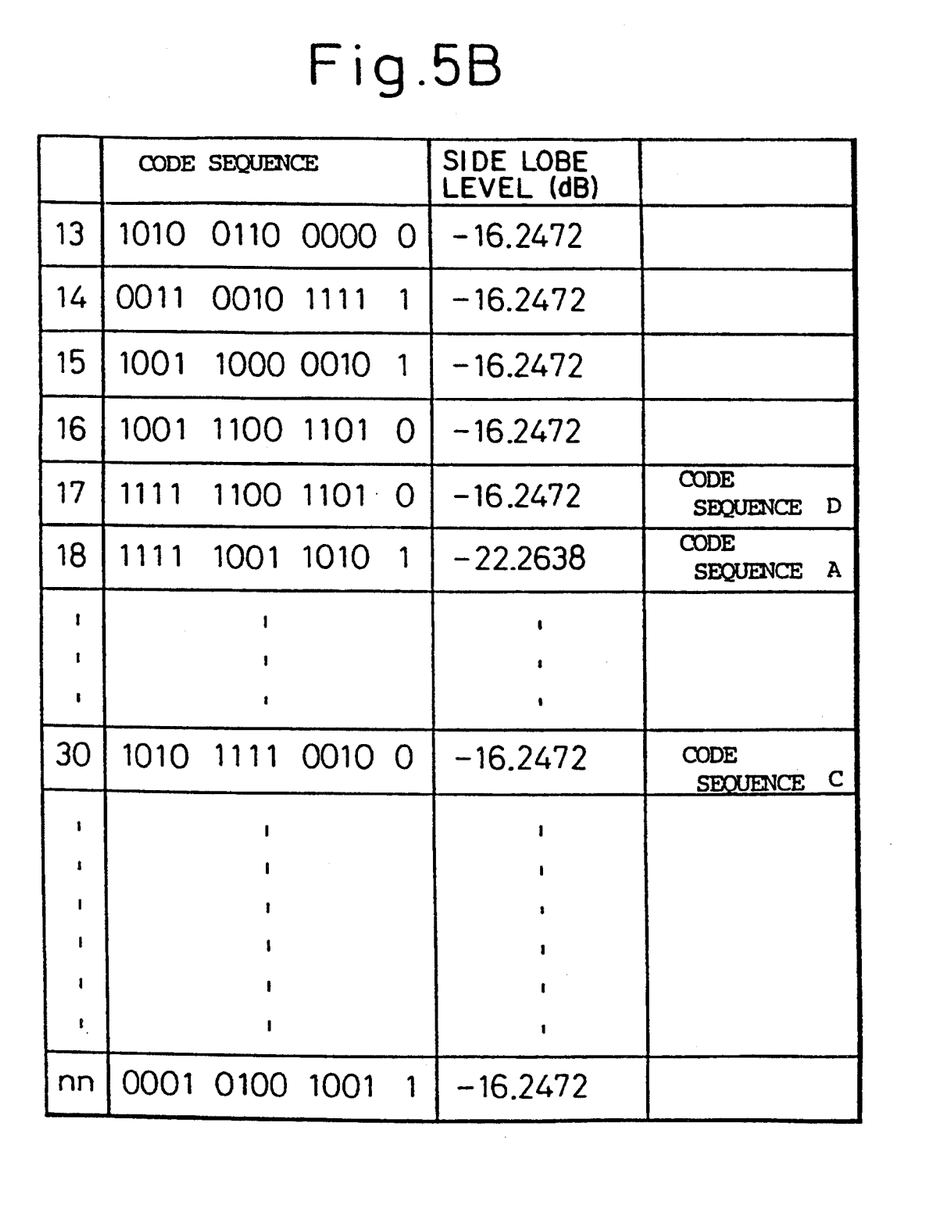

When the code sequence is 13 bits, code sequences are extracted from random code sequences obtained by using the mathematical Chaos phenomenon so that the autocorrelation side lobe level becomes less than −15 dB, then, as shown in FIG. 5A and FIG. 5B, many code sequences exist. An eighteenth code sequence A therein ("1111100110101") corresponds to the Barker code and the autocorrelation side lobe level becomes −22.2638 dB. This code sequence A is generated from the ideal code generation section 17 as an ideal code sequence. A twelfth code sequence A' is inverted from the code sequence A in sequence and code. Since the code sequence A' also becomes −22.2638 dB in the autocorrelation side lobe level, the code sequence A' becomes the ideal code sequence.

In this embodiment, one of the code sequences shown in FIG. 5A and FIG. 5B is output from the code output section 15 (conf. FIG. 3) by the code selection signal CS. Namely, in the prior example, when the code sequence is 13 bits, since only the ideal code sequence is utilized, the two code sequences A and A' are extracted. However, in this embodiment, as mentioned above, several ten kinds of code sequences can be used.

Figure 6:
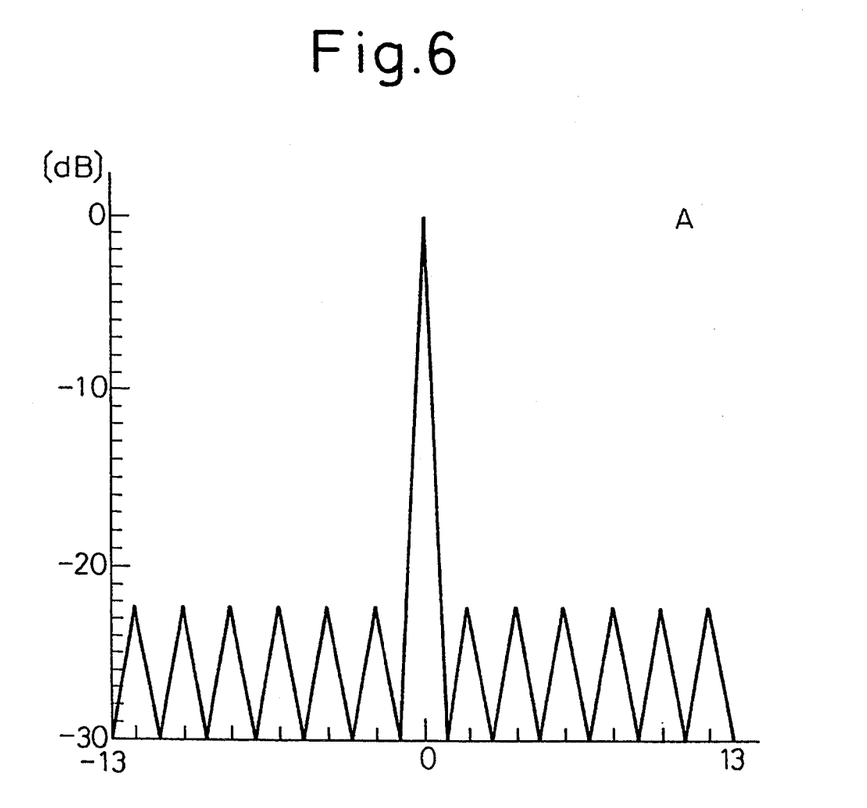
FIG. 6 is a diagram showing an autocorrelation side lobe pattern of a code sequence A of FIG. 5B.
Figure 7:
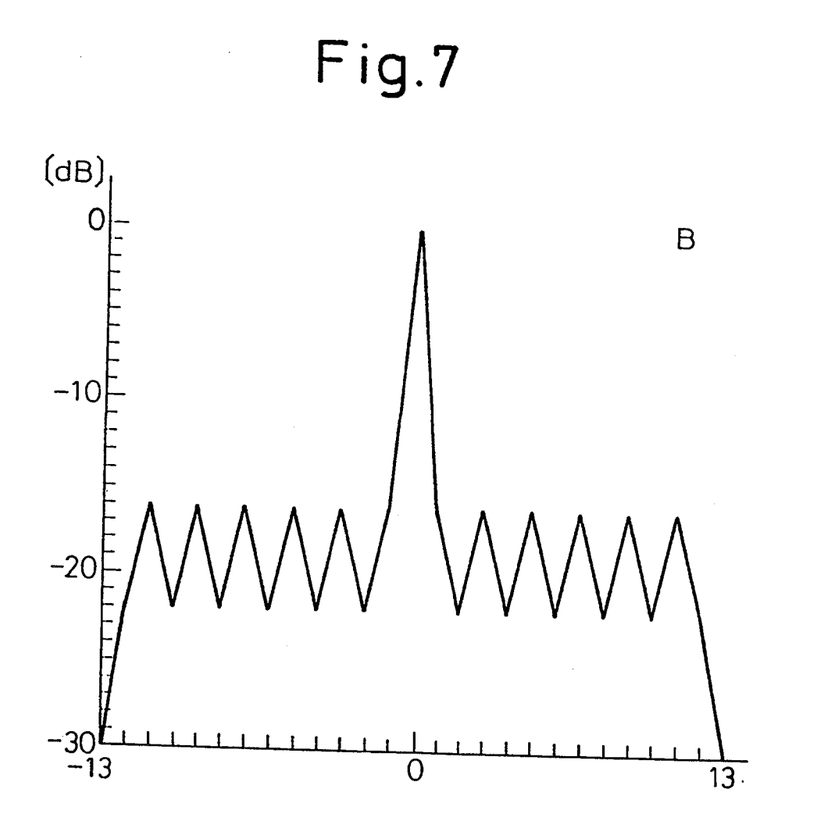
FIG. 7 is a diagram showing an autocorrelation side lobe pattern of a code sequence B of FIG. 5A.
Figure 8:
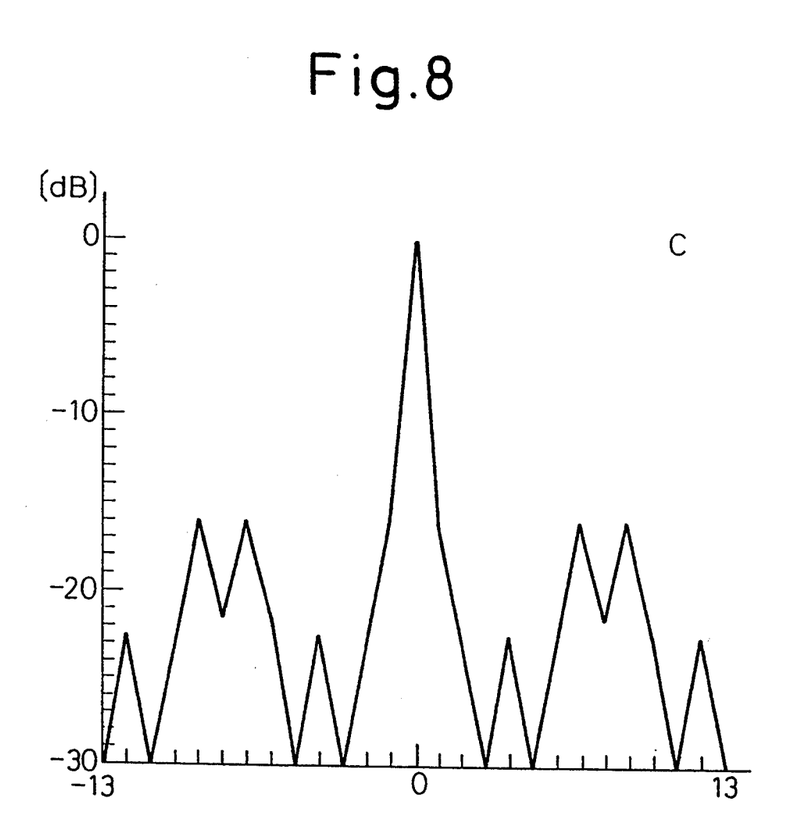
FIG. 8 is a diagram showing an autocorrelation side lobe pattern of a code sequence C of FIG. 5B.
Figure 9:
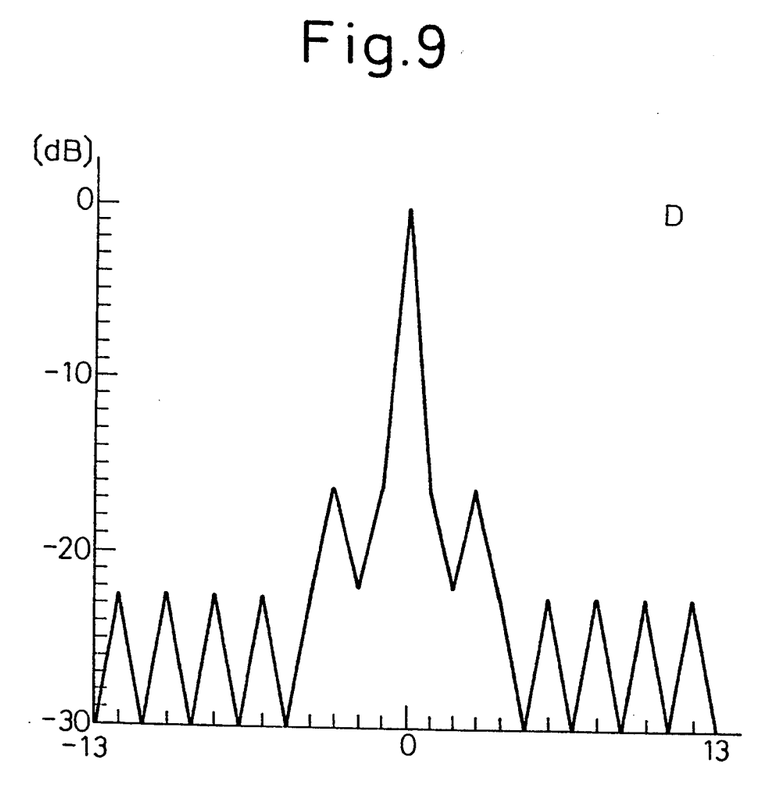
FIG. 9 is a diagram showing an autocorrelation side lobe pattern of a code sequence D of FIG. 5B.

The autocorrelation side lobe patterns in the above-mentioned eighteenth ideal code sequence A in FIG. 5A and FIG. 5B are shown in FIG. 6. Namely, the autocorrelation side lobe level is −22.2638 dB and is level one. Since the autocorrelation side lobe level is low, detection of the peak value is easy. The respective autocorrelation side lobe patterns of 8th code sequence B, 30th code sequence C, and 17th code sequence D in the code sequences having the autocorrelation side lobe level of −16.2472 dB in FIG. 5A and FIG. 5B are shown in FIG. 7, FIG. 8, and FIG. 9. Namely, the two levels of −16.2472 dB and −22.2638 dB are utilized. The respective autocorrelation side lobe patterns of the code sequences of the other 1st to 7th, 9th to 11th, 13th to 16th, or the like attain a level two pattern.

The key code generation section 16 (conf. FIG. 3) supplies the difference "1000101101010" between the ideal code sequence A from the ideal code generation section 17 and e.g., the code sequence B from the code output section 15, to the code conversion section 25 as a key code sequence K. The code sequence B ("0111001011111") from the code output section 15 is supplied to the phase modulation section 12, the pulse from the pulse generation section 11 is phase modulated by the transmission code sequence B having 13 bits, is amplified by the transmission amplifier section 13, and is transmitted from the transmission antenna 14.

A reflected pulse from a target 20 is received by the reception antenna 21, amplified by the reception amplifier section 22, and demodulated by the phase demodulation section 23 to supply to the code detection section 24. In the code detection section 24, as mentioned above, the transmission code sequence b is set on the reference register 32 (conf. FIG. 4), the demodulated signal a is input to the input register 31 to shift sequentially, the two signals are compared in each bit, if all 13 bits coincide, then the output signal c from the addition circuit 33 becomes '13', and if the set value d is, for example, '10', the output signal f from the decision circuit 34 is "1". The set value d is set to possible peak detection when the peak output signal c from the addition circuit 33 is not '13' ideally as a result of noise or the like. However, another coincidence detection means can be used.

Since the code sequence is constituted by 13 bits, 13 is set to the counter 42 as a bit number g. When the output signal f from the decision circuit 34 is "1", the Q terminal output signal i from the flip-flop 43 is "1", and the counter 42 starts to count the clock signal. Further, when the Q terminal output signal i from the flip-flop 43 is "1", the key code register 41 attains shift mode, the above-mentioned key code sequence is shifted sequentially to be output, and is supplied to the exclusive OR circuit 45 through the AND circuit 44. When the key code sequence of 13 bits is shifted and outputted from the key code register 41, since the counter 42 becomes '0' by a count down 13 times, the Q terminal output signal i from the flip-flop 43 becomes "0" by the output signal h from counter 42.

To the exclusive OR circuit 45, also the output signal e from the input shift register 31 is supplied, and since the reception code sequence is identical with the transmission code sequence B, the output signal n from the exclusive OR circuit 45 becomes as follows, and the output signal is converted to the ideal code sequence A. Where (+) designates an exclusive logical addition.

```
    "0111001011111"  ←  (reception code sequence =
                         transmission code
                         sequence B)
(+) "1000101101010"  ←  (key code sequence K)
    "1111100110101"  ←  (ideal code sequence A)
```

The ideal code sequence A from the code conversion section 25 is supplied to the autocorrelation processing section 26, obtains autocorrelation with the ideal code sequence A from the ideal code generation section 17, the pulse is compressed and supplied to the display section 27, and the position of the target is displayed by a bright spot or the like.

If the transmission code sequence is code sequence C, which is 30th in FIG. 5B, the key code sequence K is "0101011010001". If the transmission code sequence is code sequence D which is 17th, the key code sequence K is "0000010101111". When another code sequence is selected to be the transmission code sequence, the difference between the transmission code sequence and the ideal code sequence A is the key code sequence K, and in the code conversion section 25, the reception code sequence can be converted to the ideal code sequence A by using the key code sequence K. Therefore, in the autocorrelation processing section 26, the pulse compression can be carried out in accordance with the same processing as in the case when the ideal code sequence A is the transmission code sequence.

As mentioned above, if the transmission period of the coded phase modulation pulse, which is modulated by the transmission code sequence constituted with 13 bits, is, for example 20 µs to 100 µs and if the length of 1 bit of the transmission code sequence is 0.2 µs, the transmission pulse has a pulse width of 2.6 µs. To receive the reflection pulse of the transmission pulse and detect the coincidence of the demodulated reception sequence code and the transmission code sequence by the code detection section 24, it takes time, during which the code sequence of 13 bits is shifted in the input shift register 31, namely the amount of time equal to the transmission pulse width. Further, in the code conversion section 25, since the code conversion is carried out by sequentially shifting the key code sequence K constituted of 13 bits in the key code register 41, it also takes an amount of time equal to the transmission pulse width in the code conversion section 25. Accordingly, it takes 2.6 µs for the detection of the transmission code sequence and for the conversion process to the ideal code sequence, thus, the process can be carried out during a sufficiently short time compared with the transmission period.

Although the code sequence in the above embodiment is constituted by 13 bits, the use of another code sequence constituted with another bit number is, of course, possible, for example, an autocorrelation function of the code sequences having a desired bit length in the random code sequence utilizing the mathematical Chaos phenomenon is obtained, the side lobe level thereof less than e.g., −15 dB is extracted, and the extracted code sequence can be the transmission code sequence. Further in the coded pulse radar in a high density state, since many kinds of usable transmission code sequences exist, distinguishing from each other is possible by selecting the respective different kinds of code sequences.

The above embodiment can be applied to a synchronous pulse for communication. If the synchronous pulse multiplied by time division is modulated by respective different transmission code sequences and transmitted, only the reception section that sets the identical code sequence with the transmission code sequence precedingly establishes synchronization and the reception process can be carried out. In this case, also by conversion to the ideal code sequence, the reliable synchronous timing can be found by the pulse compression. Further, by changing the transmission code sequence in each communication or in accordance with the time lapse, a processing similar to secret communication using a cipher is possible. In addition, the present invention is not limited to only the above embodiment, various additions or changes are possible.

As explained above, since this invention uses the code sequence having a larger autocorrelation side lobe level compared with the ideal code sequence as a transmission code sequence, many usable kinds of transmission code sequences are utilized. Accordingly, if this invention is applied to a coded pulse radar in a high density state, distinguishing between code sequences is possible. Further, if this invention is applied to a synchronous signal in a multi-access communication system, reception subscribers increase.

Since the pulse modulated by the transmission code sequence is received and demodulated, and the demodulated pulse is converted to the ideal code sequence by using the key code sequence to process the autocorrelation, even if the code sequence having a larger autocorrelation side lobe level is used, it is still possible to produce an ideal pulse compression.

We claim:

1. A pulse compression control system comprising:
a first order modulation means for modulating a pulse using a transmission code sequence which has larger self correlation side lobes than those of an ideal code sequence wherein a self correlation function has a sharp peak at one point and has side lobes, and for transmitting a modulated pulse;
a demodulation means for demodulating the modulated pulse to obtain a reception code sequence;
a second order modulation means for modulating the reception code sequence from the demodulation means so as to obtain said ideal code sequence; and
a self correlation processing means for carrying out pulse compression processing of the ideal code sequence outputted from the second order modulation means,
said first order modulation means including a code output section receiving a code selection signal for outputting one of the code sequences having a sharp peak value at one point in said self correlation function thereof and a self correlation side lobe level of no more than level two, in accordance with the code selection signal, and further including a key code generation section connected to said code output section for supplying the code sequence of a difference between said ideal code sequence and the code sequence from said code output section as a key code sequence to said second order modulation means;

said second order modulation means including a code detection section for adding the reception code sequence from said demodulation means and an output from said code output section, and for outputting a decision result of an added value, further including a code conversion section for receiving an output from said key code generation section and an output of said code detection section and for converting said output of said code detection section to the ideal code sequence.

2. A coded pulse radar using a pulse compression control system comprising:

a first order modulation means for modulating a pulse using a transmission code sequence which has larger self correlation side lobes than those of an ideal code sequence wherein a self correlation function has a sharp peak at one point and low side lobes, and for transmitting the modulated pulse;

a demodulation means for demodulating a received reflection of said modulated pulse to obtain a reception code sequence;

a second order modulation means for modulating the reception code sequence from the demodulation means so as to obtain said ideal code sequence; and a self correlation processing means for carrying out pulse compression processing of the ideal code sequence outputted from the second order modulation means, said first order modulation means including a code output section receiving a code selection signal for outputting one of the code sequences having a sharp peak value at one point in said self correlation function thereof and a self correlation side lobe level of no more than level two, in accordance with the code selection signal, and further including a key code generation section connected to said code output section for supplying the code sequence of a difference between said ideal code sequence and the code sequence from said code output section as a key code sequence to said second order modulation means;

said second order modulation means including a code detection section for adding the reception code sequence from said demodulation means and an output from said code output section and for outputting a decision result of an added value, further including a code conversion section for receiving an output from said key code generation section and an output of said code detection section and for converting said output of said code detection section to the ideal code sequence.

* * * * *